(12) United States Patent
Goodwill et al.

(10) Patent No.: US 11,852,227 B1
(45) Date of Patent: Dec. 26, 2023

(54) CLUTCH WITH APPLY CHAMBER PRESSURE RELEASE PORT

(71) Applicant: Schaeffler Technologies AG & Co. KG, Herzogenaurach (DE)

(72) Inventors: Edward Goodwill, Wooster, OH (US); Brian Zaugg, Millersburg, OH (US); Natalie Allen, Richfield, OH (US); Alfredo Perez Mitre Jimenez, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/081,651

(22) Filed: Dec. 14, 2022

Related U.S. Application Data

(60) Provisional application No. 63/399,288, filed on Aug. 19, 2022.

(51) Int. Cl.
  *F16H 45/02* (2006.01)
  *F16D 25/0638* (2006.01)

(52) U.S. Cl.
  CPC ......... *F16H 45/02* (2013.01); *F16D 25/0638* (2013.01); *F16H 2045/0284* (2013.01)

(58) Field of Classification Search
  CPC ............. F16H 45/02; F16H 2045/0284; F16D 25/0638; F16D 25/0635; F16D 25/063; F16D 25/062; F16D 25/08; F16D 25/048; F16D 25/042; F16D 25/044; F16D 25/123; F16D 2300/08; B60K 6/38; B60K 6/387
  See application file for complete search history.

(56) References Cited

U.S. PATENT DOCUMENTS

| | | | |
|---|---|---|---|
| 2012/0006642 A1* | 1/2012 | Greathouse | F16H 45/02 192/3.29 |
| 2015/0285316 A1* | 10/2015 | Ari | F16D 25/02 192/85.25 |
| 2020/0284331 A1 | 9/2020 | Hoff et al. | |
| 2021/0010578 A1* | 1/2021 | de Lima Zocca | F16H 41/28 |
| 2021/0126498 A1* | 4/2021 | Großpietsch | B60K 6/38 |
| 2022/0216765 A1* | 7/2022 | Ikemura | B60K 17/02 |
| 2023/0012163 A1* | 1/2023 | Kim | F16H 57/0424 |

FOREIGN PATENT DOCUMENTS

| | | | | |
|---|---|---|---|---|
| DE | 102007061950 A1 * | 6/2009 | | F16D 25/0638 |
| EP | 1008784 A2 * | 6/2000 | | F16H 45/02 |

* cited by examiner

*Primary Examiner* — Jacob S. Scott
*Assistant Examiner* — Farhana Pervin

(57) ABSTRACT

A K0 clutch includes a housing, a piston, and an apply chamber. The housing includes an axial wall and a port extending radially outward from the axial wall. The piston includes a seal engaged with the axial wall. The piston is axially slidable relative to the axial wall. The apply chamber is disposed between the piston and the housing. The apply chamber is selectively fluidly communicable with the port based on a pressure in the apply chamber.

16 Claims, 2 Drawing Sheets

CLUTCH WITH APPLY CHAMBER PRESSURE RELEASE PORT

CROSS-REFERENCE TO RELATED APPLICATIONS

This application claims the benefit of U.S. Provisional Patent Application No. 63/399,288, filed Aug. 19, 2022, the disclosure of which is incorporated in its entirety by reference herein.

TECHNICAL FIELD

The present disclosure relates generally to a hybrid module and, more specifically, to a K0 clutch for a hybrid module.

BACKGROUND

Hybrid modules are generally known. Often, it is a challenge to package and/or fit all the desired components, e.g., an e-motor, crank damper, torque converter, torque converter clutch, K0 clutch, and resolver within the hybrid module architecture due to axial constraints. Due to limited spacing for within a hybrid module envelope, it is desirable to have alternative designs and configurations to fit all the necessary components within the hybrid module while still meeting durability and performance requirements.

SUMMARY

Embodiments of the present disclosure provide a K0 clutch including a housing, a piston, and an apply chamber. The housing includes an axial wall and a port extending radially outward from the axial wall. The piston includes a seal engaged with the axial wall. The piston is axially slidable relative to the axial wall. The apply chamber is disposed between the housing and the piston. The apply chamber is selectively fluidly communicable with the port based on a pressure in the apply chamber.

In embodiments, the seal may be arranged to prevent fluid communication between the apply chamber and the port in response to the pressure in the apply chamber being less than a threshold pressure. The seal may be disposed axially between the port and the housing when the pressure in the apply chamber is less than the threshold pressure.

In embodiments, the port may be arranged to permit fluid communication between the apply chamber and the port in response to the pressure in the apply chamber being greater than or equal to a threshold pressure. At least a portion of the port may be disposed axially between the seal and the housing when the pressure in the apply chamber is greater than or equal to the threshold pressure. The piston may be configured to close the K0 clutch when the pressure in the apply chamber is equal to a closing pressure. The closing pressure may be less than the threshold pressure. The piston may be configured to elastically deflect in response to the pressure in the apply chamber exceeding the closing pressure.

In embodiments, the housing may include a radial wall extending radially outward from the axial wall. The port may extend through the radial wall. In embodiments, the port may be positioned to be fluidly connected to the apply chamber in response to the pressure in the apply chamber being greater than or equal to a threshold pressure. The piston may be configured to deflect axially across at least a portion of the port in response to the pressure in the apply chamber being greater than or equal to the threshold pressure.

Embodiments of the present disclosure further provide a hybrid module including a rotor flange, a torque converter disposed on a first axial side of the rotor flange, and K0 clutch disposed on a second, opposite axial side of the rotor flange. The K0 clutch includes a housing having an axial wall and a port extending radially outward from the axial wall. The K0 clutch further includes a clutch pack axially spaced from the housing. The K0 clutch further includes a piston disposed axially between the clutch pack and the housing and being axially slidably to engage the clutch pack. The piston includes a seal engaged with the axial wall. The K0 clutch further includes an apply chamber bounded in part by the piston and the housing. The apply chamber is selectively fluidly communicable with the port based on a pressure in the apply chamber.

In embodiments, the seal may be arranged to prevent fluid communication between the apply chamber and the port in response to the pressure in the apply chamber being less than a threshold pressure. The seal may be disposed axially between the port and the housing when the pressure in the apply chamber is less than the threshold pressure.

In embodiments, the port may be arranged to permit fluid communication between the apply chamber and the port in response to the pressure in the apply chamber being greater than or equal to a threshold pressure. At least a portion of the port may be disposed axially between the seal and the housing when the pressure in the apply chamber is greater than or equal to the threshold pressure. The piston may be configured to close the K0 clutch when the pressure in the apply chamber is equal to a closing pressure. The closing pressure may be less than the threshold pressure. The piston may be configured to elastically deflect in response to the pressure in the apply chamber exceeding the closing pressure.

In embodiments, the housing may include a radial wall extending radially outward from the axial wall. The port may extend through the radial wall. In embodiments, the port may be positioned to be fluidly connected to the apply chamber in response to the pressure in the apply chamber being greater than or equal to a threshold pressure. The piston may be configured to deflect axially across at least a portion of the port in response to the pressure in the apply chamber being greater than or equal to the threshold pressure.

Embodiments of the present disclosure provide the advantageous benefit of a reduced likelihood of K0 clutch components being subjected to excessive apply pressure, for example, by providing a port for controlling an apply pressure in the K0 clutch. Further embodiments disclosed herein offer design advantages by controlling an apply pressure without increasing an envelope of the clutch assembly, which can reduce costs and complexity of the K0 clutch while satisfying packaging constraints in hybrid modules with limited space.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
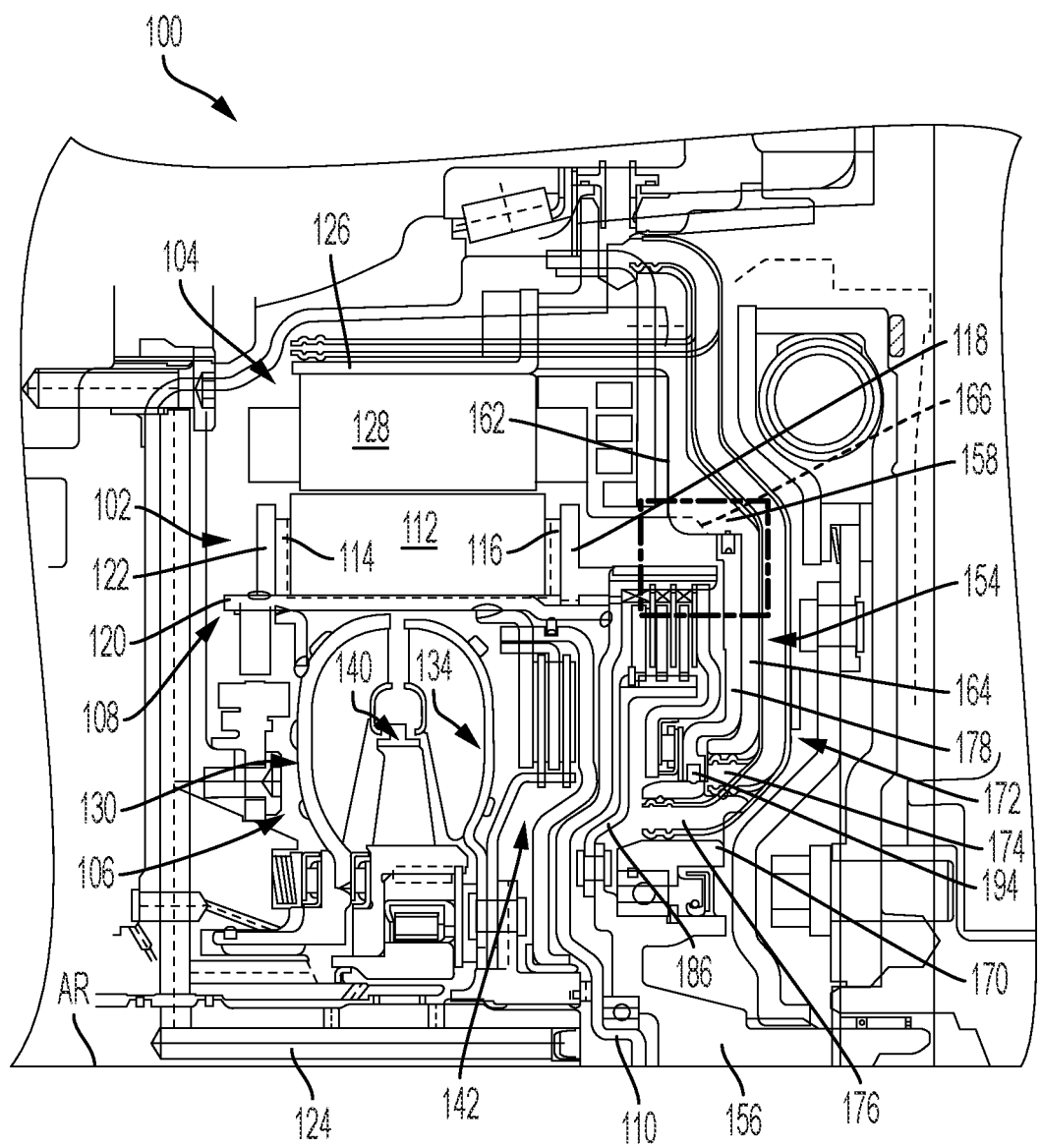
FIG. 1 shows a partial cross-sectional view of a hybrid module according to an exemplary embodiment of the present disclosure.
Figure 2:
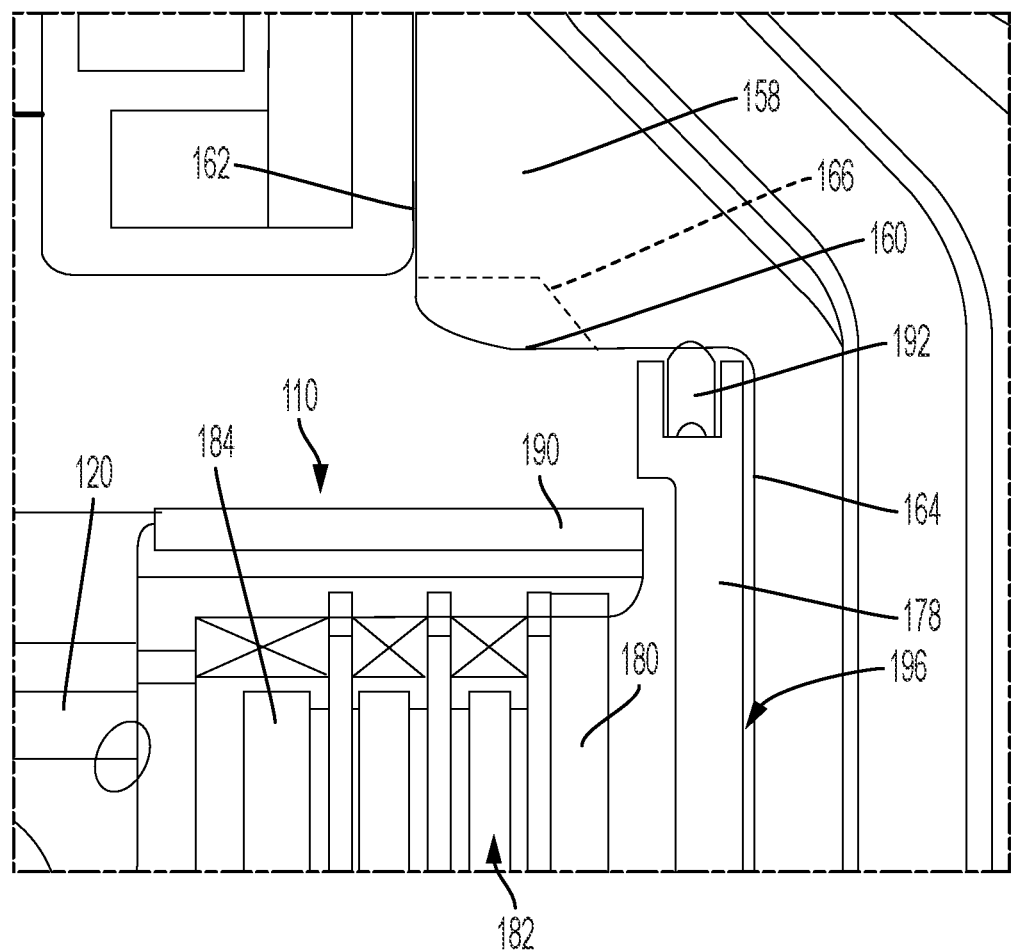
FIG. 2 illustrates an enlarged view of an area of the hybrid module shown in FIG. 1.

Referring to FIGS. 1-2 a portion of a hybrid module 100 is illustrated according to an exemplary embodiment of the present disclosure. At least some portions of the hybrid module 100 are rotatable about an axis of rotation AR. While only a portion of the hybrid module 100 above the axis of rotation AR is shown in FIG. 1, it should be understood that the hybrid module 100 can appear substantially similar below the axis of rotation AR with many components extending about the axis of rotation AR. Words such as "axial," "radial," "circumferential," "outward," etc. as used herein are intended to be with respect to the axis of rotation AR.

The hybrid module 100 includes a rotor assembly 102 and a stator assembly 104 forming an e-motor assembly. The rotor assembly 102 includes a rotor carrier 108, a rotor flange 110, a rotor segment 112, a spring end plate 114, a spring end plate 116, and an end ring 118. The rotor carrier 108 includes an axially extending portion 120 and a radially extending portion 122. The rotor flange 110 is fixed to the axially extending portion 120 of the rotor carrier 108 and extends radially inward toward the axis of rotation AR, wherein the rotor flange 110 is configured to connect with a transmission input shaft 124. The rotor flange 110 may include an axially extending portion 190 extending away from the rotor assembly 102.

The rotor segment 112 is installed and arranged on an outer surface of the axially extending portion 120 of the rotor carrier 108. In one embodiment, the rotor segment 112 may be comprised of a stack of segments. The spring end plates 114, 116 are assembled on opposite axial sides of the rotor segment 112. The end ring 118 is fixed to the outer surface of the axially extending portion 120 of the rotor carrier 108 adjacent to the spring end plate 114. In this way, the spring end plate 114 is disposed axially between the end ring 118 and the rotor segment 112, and the spring end plate 116 is disposed axially between the rotor segment 112 and the radially extending portion 122 of the rotor carrier 108.

The end ring 118 is configured to compress the spring end plates 114, 116 to clamp and/or secure the rotor segment 112 to the rotor carrier 108 for frictional torque transmission therebetween. Once the desired compression force is achieved, the end ring 118 is fixed to the rotor carrier 108, e.g., by welding.

The stator assembly 104 is disposed radially outside of the rotor assembly 102 and is fixed relative to the rotor assembly 102. The stator assembly 104 includes a stator carrier 126 and a stator segment 128. In one embodiment, the stator segment 128 may be a stack of stator segments. The stator segment 128 is installed and arranged on an inner surface of the stator carrier 126. In one embodiment, the stator segment 128 may be installed on the stator carrier 126 via a shrink fit arrangement. That is, the stator carrier 126 is heated to expand the inner surface, the stator segment 128 is installed on the stator carrier 126, and the inner surface shrink fits to the stator segment 128 after the stator carrier 126 cools.

The hybrid module 100 further includes a torque converter assembly 106 fully disposed radially inside the rotor assembly 102. The torque converter assembly 106 includes: an impeller 130 having an impeller shell with at least one blade attached thereto, a turbine 134 having a turbine shell with at least one blade attached thereto; a stator 140 having at least one blade attached thereto; and a lock-up clutch 142. The impeller shell may be fixed to the rotor carrier 108, e.g., via a welded connection. The impeller shell and the rotor carrier 108 together form a housing for the torque converter assembly 106. The lock-up clutch 142 and the stator 140 are disposed within the housing formed by the impeller shell and the rotor carrier 108.

The lock-up clutch 142 may be disposed on a first axial side of the rotor flange 110. The lock-up clutch 142 may include: a piston (not numbered) disposed axially between the rotor flange 110 and the turbine 134; a reaction plate (not numbered) fixed to the axially extending portion 120 of rotor carrier 108 and disposed axially between the piston and the turbine 134; a plurality of clutch plates (not numbered) disposed axially between the piston and the reaction plate; and an inner disk carrier (not numbered) disposed axially between the piston and the turbine 134. The plurality of clutch plates may be connected to the inner disk carrier. The piston may be sealed to the rotor carrier 108 at a radially outer end and may be sealed to an output hub (not numbered) at a radially inner end. The inner disk carrier may be connected to the turbine shell and the output hub at a radially inner end, for example, via a riveted connection. The output hub is connected to the transmission input shaft 124 for torque transmission therebetween.

The hybrid module 100 further includes a K0 clutch 154. The K0 clutch 154 may be disposed on a second, opposite axial side of the rotor flange 110. That is, the rotor flange 110 may be disposed axially between the lock-up clutch 142 and the K0 clutch 154. The K0 clutch 154 is arranged to drivingly connect the rotor assembly 102 to a K0 shaft 156. In other words, the K0 clutch 154 selectively connects and disconnects the rotor assembly 102 and the K0 shaft 156. The K0 shaft 156 is arranged for driving connection with crankshaft (not numbered) of an internal combustion engine (not shown). In other words, the K0 shaft 156 is arranged to receive torque from the engine and/or transmit torque to the engine when installed and operated in a vehicle powered at least in part by the engine.

The K0 clutch 154 includes a housing 158. The housing 158 includes an axial wall 160 disposed radially outside of the torque converter assembly 106. The housing 158 further includes an outer radial wall 162 extending radially outward from the axial wall 160, and an inner radial wall 164 extending radially inward from the axial wall 160. The axial wall 160 extends from the inner radial wall 164 to the outer radial wall 162.

The housing 158 further includes a port 166 extending radially outward from the axial wall 160. The port 166 may extend along the axial wall 160 towards the outer radial wall 162. In the embodiment shown in the Figures, the port 166 extends along the axial wall 160 through the outer radial wall 162. The port 166 may be disposed closer to the outer radial wall 162 than to the inner radial wall 164. The housing 158 may include any suitable number of ports 166, e.g., one or more. In an example in which the housing 158 includes a plurality of ports 166, the ports 166 may be circumferentially spaced from each other about the axis of rotation AR.

The K0 clutch 154 may further include a hub 170 supported on and sealed to the K0 shaft 156, and a bulkhead 172 supported by the hub 170. The bulkhead 172 may include an apply channel 174 for providing a hydraulic pressure to the K0 clutch 154 and a cooling channel 176 for providing a balancing oil to the K0 clutch 154. The cooling channel 176 may be sealed to the hub 170. The apply channel 174 may be sealed to the hub 170 and the housing 158, e.g., at an inner diameter of the housing 158.

The K0 clutch 154 further includes a piston 178, a plurality of clutch plates 182, and a reaction plate 184. The reaction plate 184 may be fixed to a support flange 186 connected, e.g., via a riveted connection, to a radially extending outer portion of the K0 shaft 156. The clutch plates 182 being disposed axially between the reaction plate 184 and a pressure plate 180 connected to the axially extending portion 190 of the rotor flange 110. At least some of the clutch plates 182 may be connected to the support flange 186. At least some of the clutch plates 182 may be connected to the axially extending portion 190 of the rotor flange 110. The piston 178 is disposed axially between the reaction plate 184 and the housing 158, i.e., the inner radial wall 164. The piston 178 may be configured to be sealed to the hub 170 at an inner diameter of the piston 178 via a seal 194 and configured to be sealed to the axial wall 160 of the housing 158 at an outer diameter of the piston 178 via a seal 192.

The piston 178 closes the K0 clutch 154 in response to pressurization of a medium (e.g., fluid such as oil) in a piston apply chamber 196 defined, or bounded, in part between the housing 158 and the piston 178. That is, when K0 clutch 154 engagement is desired, pressure is introduced through the apply channel 174 to the piston apply chamber 196. Once pressure in the apply chamber 196 reaches a closing pressure, i.e., applies sufficient force on the piston 178, the piston 178 slides along the hub 170 and the axial wall 160 of the housing 158 engaging and compressing the clutch plates 182 against the reaction plate 184. Meanwhile, flow from the cooling channel 176 flows into a rest of the K0 clutch 154. By "bounded in part," we mean that a portion of the cited chamber, flow path, or other structure is bounded, or formed, by the cited element.

The port 166 is provided to allow fluid flow between the piston apply chamber 196 and the rest of the K0 clutch 154 to release pressure in the piston apply chamber 196. During operation of the hybrid module 100, the piston 178 axially slides along the axial wall 160 and the hub to close the K0 clutch 154 when subjected to the closing pressure in the piston apply chamber 198, as discussed above. In this situation, the seals 192, 194 maintain a fluid separation between the piston apply chamber 196 and the rest of the K0 clutch 154. In an example in which the pressure in the apply chamber 196 increases above the closing pressure, the piston 178 may be configured to elastically deflect, e.g., bend relative to the pressure plate 180, away from the inner radial wall 164 of the housing 158. In this situation, the seal 192 crosses a portion of the port 166 in response to the pressure in the apply chamber 196 reaching a threshold pressure. That is, the threshold pressure is greater than the closing pressure. When the pressure in the piston apply chamber 196 is less than the threshold pressure, the seal 192 is disposed axially between the port 166 and the inner radial wall 164 of the housing 158. When the pressure in the piston apply chamber 196 reaches the threshold pressure, at least a portion of the port 166 is disposed between the seal 192 and the inner radial wall 164 of the housing 158. The threshold pressure can be specified by a manufacturer of a vehicle and/or component thereof. The threshold pressure may be outside of an operating range for the K0 clutch 154. For example, the threshold pressure may correspond to a pressure exerted in the piston apply chamber 196 during a vehicle impact.

The port 166 is arranged along the axial wall 160 of the housing 158 based on the threshold pressure. That is, the port 166 is arranged such that the piston 178 will deflect and move the seal 192 across an edge of the port 166 when subjected to the threshold pressure. Prior to the seal 192 crossing the edge of the port 166, the apply chamber 196 is sealed from the rest of the K0 clutch 154. When the seal 192 crosses the edge of the port 166, the piston apply chamber 196 is in fluid communication with the rest of the K0 clutch 154 via the port 166. That is, pressurized fluid may be supplied from the piston apply chamber 196 and routed through the port 166 and into the rest of the K0 clutch 154 thereby reducing the pressure in the piston apply chamber 196.

The port 166 may be further provided to control a flow rate from the piston apply chamber 196, e.g., based on a volume of fluid permitted to flow from the piston apply chamber 196 via the ports 166 and the threshold pressure. For example, the port 166 may be configured to extend any suitable amount radially from the axial wall 160, axially towards the radial walls 162, 164, and/or circumferentially along the axial wall 160 to control the volume of fluid permitted to flow from the piston apply chamber 196. Additionally, or alternatively, the volume of fluid permitted to flow from the piston apply chamber 196 can be controlled based on a number of ports 166 and/or a spacing between the ports 166.

Providing the port 166 in the housing 158 allows for releasing pressure from the piston apply chamber 196 when the pressure reaches a threshold pressure, which can reduce a likelihood of components of the K0 clutch 154 being deformed by excessive apply pressure. Further, the embodiments disclosed herein allows for releasing the pressure from the piston apply chamber 196 without increasing a thickness of various components within the hybrid module and/or increasing an envelope of the K0 clutch 154, which can reduce costs and complexity of the hybrid module and can assist in packaging the K0 clutch 154 in smaller envelopes for the hybrid module 100.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated.

While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS

- 100 hybrid module
- 102 rotor assembly
- 104 stator assembly
- 106 torque converter assembly
- 108 rotor carrier
- 110 rotor flange
- 112 rotor segment
- 114 spring end plate
- 116 spring end plate
- 118 end ring
- 120 axially extending portion
- 122 radially extending portion
- 124 transmission input shaft
- 126 stator carrier
- 128 stator segment
- 130 impeller
- 134 turbine
- 140 stator
- 142 lock-up clutch
- 154 K0 clutch
- 156 K0 shaft
- 158 housing
- 160 axial wall
- 162 outer radial wall
- 164 inner radial wall
- 166 port
- 170 hub
- 172 bulkhead
- 174 apply channel
- 176 cooling channel
- 178 piston
- 180 pressure plate
- 182 clutch plates
- 184 reaction plate
- 186 support flange
- 190 axially extending portion
- 192 seal
- 194 seal
- 196 piston apply chamber
- AR axis of rotation

What is claimed is:

1. A K0 clutch, comprising:
a housing having an axial wall and a port extending radially outward from the axial wall;
a piston including a seal engaged with the axial wall, the piston being axially slidable relative to the axial wall; and
an apply chamber disposed between the piston and the housing, the apply chamber being selectively fluidly communicable with the port based on a pressure in the apply chamber;
wherein the port is arranged to permit fluid communication between the apply chamber and the port in response to the pressure in the apply chamber being greater than or equal to a threshold pressure;
wherein the piston is configured to close the K0 clutch when the pressure in the apply chamber is equal to a closing pressure, the closing pressure being less than the threshold pressure.

2. The K0 clutch according to claim 1, wherein the seal is arranged to prevent fluid communication between the apply chamber and the port in response to the pressure in the apply chamber being less than a threshold pressure.

3. The K0 clutch according to claim 2, wherein the seal is disposed axially between the port and the housing when the pressure in the apply chamber is less than the threshold pressure.

4. The K0 clutch according to claim 1, wherein at least a portion of the port is disposed axially between the seal and the housing when the pressure in the apply chamber is greater than or equal to the threshold pressure.

5. The K0 clutch according to claim 1, wherein the piston is configured to elastically deflect in response to the pressure in the apply chamber exceeding the closing pressure.

6. The K0 clutch according to claim 1, wherein the housing includes a radial wall extending radially outward from the axial wall, the port extending through the radial wall.

7. The K0 clutch according to claim 1, wherein the port is positioned to be fluidly connected to the apply chamber in response to the pressure in the apply chamber being greater than or equal to a threshold pressure.

8. The K0 clutch according to claim 7, wherein the piston is configured to deflect axially across at least a portion of the port in response to the pressure in the apply chamber being greater than or equal to the threshold pressure.

9. A hybrid module, comprising:
a rotor flange;
a torque converter disposed on a first axial side of the rotor flange; and
a K0 clutch disposed on a second, opposite axial side of the rotor flange, the K0 clutch including:
a housing having an axial wall and a port extending radially outward from the axial wall;
a clutch pack axially spaced from the housing;
a piston disposed axially between the clutch pack and the housing and being axially slidably to engage the clutch pack, the piston including a seal engaged with the axial wall;
an apply chamber bounded in part by the piston and the housing; and
wherein the apply chamber is selectively fluidly communicable with the port based on a pressure in the apply chamber;
wherein the port is arranged to permit fluid communication between the apply chamber and the port in response to the pressure in the apply chamber being greater than or equal to a threshold pressure;
wherein the piston is configured to engage the clutch pack when the pressure in the apply chamber is equal to a closing pressure, the closing pressure being less than the threshold pressure.

10. The hybrid module according to claim 9, wherein the seal is arranged to prevent fluid communication between the apply chamber and the port in response to the pressure in the apply chamber being less than a threshold pressure.

11. The hybrid module according to claim 10, wherein the seal is disposed axially between the port and the housing when the pressure in the apply chamber is less than the threshold pressure.

12. The hybrid module according to claim 9, wherein at least a portion of the port is disposed axially between the seal and the housing when the pressure in the apply chamber is greater than or equal to the threshold pressure.

13. The hybrid module according to claim 9, wherein the piston is configured to elastically deflect in response to the pressure in the apply chamber exceeding the closing pressure.

14. The hybrid module according to claim 9, wherein the housing includes a radial wall extending radially outward from the axial wall, the port extending through the radial wall.

15. The hybrid module according to claim 9, wherein the port is positioned to be fluidly connected to the apply chamber in response to the pressure in the apply chamber being greater than or equal to a threshold pressure.

16. The hybrid module according to claim 15, wherein the piston is configured to deflect axially across at least a portion of the port in response to the pressure in the apply chamber being greater than or equal to the threshold pressure.

\* \* \* \* \*